(12) United States Patent
Fullerton (10) Patent No.: US 6,426,868 B1
(45) Date of Patent: *Jul. 30, 2002

(54) HANDHELD COMPUTER KEYBOARD SYSTEM

(76) Inventor: Robert L. Fullerton, 9220 N. Egret Ct., Gilroy, CA (US) 95020

( * ) Notice: Subject to any disclaimer, the term of this patent is extended or adjusted under 35 U.S.C. 154(b) by 0 days.

This patent is subject to a terminal disclaimer.

(21) Appl. No.: 09/536,036

(22) Filed: Mar. 27, 2000

Related U.S. Application Data (63) Continuation of application No. 09/251,847, filed on Feb. 17, 1999.
(60) Provisional application No. 60/104,172, filed on Oct. 13, 1998.

(51) Int. Cl.[7] .................................................. G06F 1/16
(52) U.S. Cl. ........................ 361/680; 361/679; 361/681; 361/683; 361/686
(58) Field of Search ................................. 361/679, 680, 361/681, 683, 686

(56) References Cited

U.S. PATENT DOCUMENTS

| 5,974,238 A | * | 10/1999 | Chase, Jr. | ............... 395/200.78 |
| 6,034,701 A | * | 3/2000 | Drebus | ........................ 345/467 |
| 6,108,200 A | * | 8/2000 | Fullerton | ..................... 361/686 |

* cited by examiner

*Primary Examiner*—Darren Schuberg
*Assistant Examiner*—Yean-Hsi Chang
(74) *Attorney, Agent, or Firm*—The Kline Law Firm (57) ABSTRACT

A handheld computer keyboard system for use in conjunction with small computerized apparatus such as Personal Digital Assistants (PDAs) features a keyboard, a cover, and an I/O connector to allow a computerized apparatus to be connected to the keyboard. The system also features a retractable stabilizing leg for greater stability when the system is set on a flat surface. The system allows a user to input text and data into a device such as a PDA, which typically must be done with a stylus, with a more convenient keyboard. The cover for the system closes to protect the keyboard and provides a support easel for the PDA when the system is in use.

18 Claims, 11 Drawing Sheets

HANDHELD COMPUTER KEYBOARD SYSTEM

CROSS-REFERENCE TO RELATED APPLICATIONS

This application is a continuation of U.S. patent application Ser. No. 09/251,847 filed on Feb. 17, 1999 that claims the benefit of U.S. Provisional Patent Application No. 60/104,172 filed on Oct. 13, 1998. This application is also related to U.S. patent application Ser. No. 29/100,882 filed on Feb. 18, 1999, incorporated herein by reference.

BACKGROUND OF THE INVENTION

1. The Field of the Invention

The present invention relates to keyboards for electronic devices and, more particularly, to keyboard accessories for handheld electronic devices such as personal digital assistants (PDAs).

2. The Relevant Art

Small personal organizers, personal digital assistants (PDAs), palm-size computers, combination phone/computers and other devices that are commonly termed "pen-based computers" often rely on the use of a stylus for data entry. The two most common methods for data entry utilizing a stylus are 1) tapping on an "on-screen software keyboard" and 2) hand writing on a pressure-sensitive layer. In the first method the electronic device displays a keyboard, buttons, or other indicia on a pressure sensitive screen, and the user selects the desired option by tapping an appropriate location with the stylus. In the second method the user moves the stylus across a pressure-sensitive surface to form characters. In this latter method, known as "handwriting recognition," the device must "recognize" the characters formed by the user on the pressure-sensitive surface. Handwriting recognition affords the user greater flexibility and speed in making notations and composing messages, but has been prone to errors in recognition.

Pen-based computers have grown in popularity for several reasons, chief amongst them being their small size and easy portability. Miniaturization of electronic components has made these devices increasingly powerful, versatile, and affordable. Many users, however, find the two available stylus data-entry methods cumbersome and prone to errors. The tapping method is typically slow, and the small screen area of PDAs increases the likelihood that a user will inadvertently make unintended selections.

The handwriting recognition method affords the user greater flexibility and ease of use over the tapping method for composing messages and entering data, but handwriting recognition has its own set of limitations. The character recognition programs at the heart of these handwriting recognition methods often need to learn the handwriting of the user in order to be effective. Many users do not have the time or patience to bring their pen-based computer through this learning process. Even those users that do train their pen-based computers to recognize their handwriting find that mistakes are unavoidable since the art of handwriting recognition is far from perfect. Errors will also be more common if the user attempts to use the device in a moving vehicle such as a car or train since the motion of the vehicle makes it more difficult to maintain one's handwriting style. Further, a pen-based computer trained to recognize one individual's writing style will not function well if transferred to a second user, and may never function well if several users routinely use it. Most users of pen-based computers are already familiar with common keyboard designs as used on typewriters, standard computers, 10-key data entry devices, telephone keypads, and the like. Users are generally comfortable with using keyboards for composing text and entering data into electronic devices. It may therefore be desirable to attach a keyboard to PDAs and other pen-based computers in order to facilitate text and data entry.

To address some of these problems the Apple Newton PDA had an available accessory keyboard. The Newton PDA's keyboard, however, is attached to the Newton PDA by way of a somewhat cumbersome cable. Further, Newton PDA's keyboard was unprotected from damage during transport, unless it was inserted into a separate carrying case. Finally, the Newton PDA itself needed to be propped up or positioned for proper viewing when using the accessory keyboard.

SUMMARY OF THE INVENTION

This present invention is a handheld computer keyboard system for use in conjunction with small computerized apparatuses that typically do not have permanently attached keyboards. In one embodiment the system consists of a keyboard hinged to a cover and an interface assembly including an I/O connector configured to engage an I/O port of a computerized apparatus. In another embodiment the system also incorporates a stabilizing leg which may slide out from a recess in the back of the keyboard. The stabilizing leg is advantageous for providing support to the system in use such that the weight of the attached apparatus, use of a stylus, or incidental jostling does not tip the system over.

In another embodiment the hinge between the keyboard and the cover allows the cover to be opened to any one of several open positions so that the user may select the best angle for optimal viewing and use. The stabilizing leg in this embodiment slides rearwardly out from a recess in the back of the keyboard. This aspect is advantageous as it protects the stabilizing leg when not in use, and reduces the size of the keyboard.

The interface assembly is preferably attached to, and moves with, the cover portion so that the cover additionally serves to stabilize the attached computer apparatus regardless of the chosen open position. In one embodiment, the I/O connector is intended to engage the I/O connector of a personal digital assistant (PDA).

The keyboard is preferably arranged in the common QWERTY layout and a plurality of additional buttons are arranged above the numeral keys, although other keypad and keyboard layouts are also used. These additional buttons are designed to have programmable functionality such that the user may associate with each button one or more computer commands that will be executed when the button is depressed.

While these embodiments are aimed at providing a convenient portable keyboard for use with PDAs, other embodiments are envisioned that utilize less common keyboard designs, that are specific to other types of computerized apparatus of a similar form-factor, and that incorporate additional features such as additional I/O connectors, wireless modems, Global Positioning Satellite (GPS) receivers, and the like.

The present invention is advantageous to users of PDAs in that it provides them a better option for interacting with their PDAs. The use of a keyboard is more effective for most people than pen-based systems. The use of a keyboard instead of a stylus allows users to enter text and data more quickly and with a lower error rate. These advantages become more important when a PDA is used in a moving vehicle or by individuals with less steady hands, or by users who have not conditioned the PDA to recognize their own handwriting.

The availability of buttons with programmable functionality allows users to customize their keyboard system to streamline repetitive tasks. The cover serves to protect the keyboard when closed. When open, the cover serves as an easel to support the attached PDA in a desired viewing position. When the PDA is attached and the stylus is used, the cover provides a back support so that lateral forces are not transmitted to the I/O connector. The stabilizing leg provides overall stability to the keyboard system to prevent the keyboard system from tipping over from the weight of the PDA from pressures applied to the PDA, or from accidental jostling, or from the motion of a vehicle such as an airliner or train.

These and other aspects and advantages of the present invention will become more apparent when the Description below is read in conjunction with the accompanying Drawings.

BRIEF DESCRIPTION OF THE DRAWINGS

The present invention will be readily understood by the following detailed description in conjunction with the accompanying drawings, with like reference numerals designating like elements.

DETAILED DESCRIPTION OF THE PREFERRED EMBODIMENTS

Figure 1:
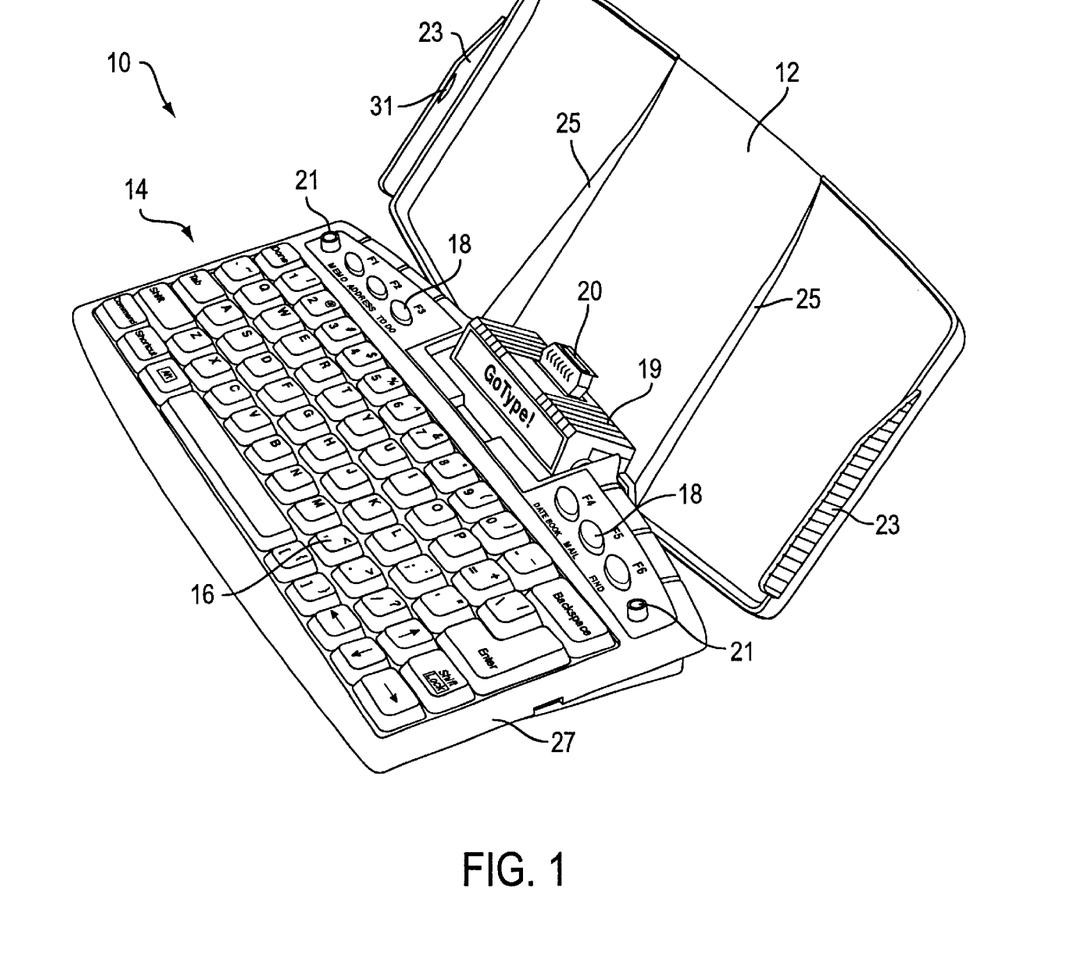
FIG. 1 is a perspective view of a keyboard system of the present invention with the cover portion open.

FIG. 1 shows a keyboard system 10 of the present invention including a cover portion 12, a keyboard portion 14, and a connector assembly 19. The keyboard portion 14 has a keypad 16 and additional buttons with programmable functionality 18 arranged above the keypad 16 to either side of the connector assembly 19. Another feature that may be placed on the keyboard portion 14 is one or more stylus receptacles 21. These components of the keyboard portion 14 are supported by a base 27, which preferably is made of a hard plastic material. While FIG. 1 shows the preferred arrangement of the components of keyboard portion 14, other embodiments have different component arrangements.

The keypad 16 is preferably an alphanumeric keypad and may be arranged according to any number of standard or non-standard designs. The most common standard design, known to those skilled in the art of keyboard designs as QWERTY, is a preferred embodiment. Alternately, the keypad may be a 10-key design for data entry or inventory control. Other embodiments include keypads specially designed to meet specific applications. For example, self-guided tours of a facility can be provided on a PDA-like computer apparatus that attaches to the present keyboard system with keys for specific functions such as "Show Map" and "Tell Me More." Buttons with programmable functionality 18 are also preferably provided. These buttons allow the user to associate with each key one or more computer commands that will be executed when the button is depressed. In the art, a series of computer instructions associated with a single key or simple command is commonly termed a macro. The ability to execute macros allows the user to take a commonly used and often times lengthy series of computer instructions and run them with the touch of a single button, thus saving the user time by eliminating keystrokes. The implementation of programmable buttons and macros are well known to those skilled in the art.

In the preferred embodiment the associated computer commands are stored by non-volatile memory when the keyboard system is not in use. Such memory logic for keyboards is well known in the art and commercially available. The preferred embodiment of the present invention draws power from the attached PDA in order to operate the keys of the keypad 14 and the buttons with programmable functionality 18. It is advantageous to draw power from the PDA as this eliminates the need for an external power supply or batteries and thus reduces weight and simplifies the use of the keyboard system 10. It is further advantageous for the keyboard system 10 to draw power from the PDA as this guarantees that the keyboard system 10 will always operate whenever the PDA has power. Suitable keyboard controllers are available from a variety of vendors.

Figure 2:
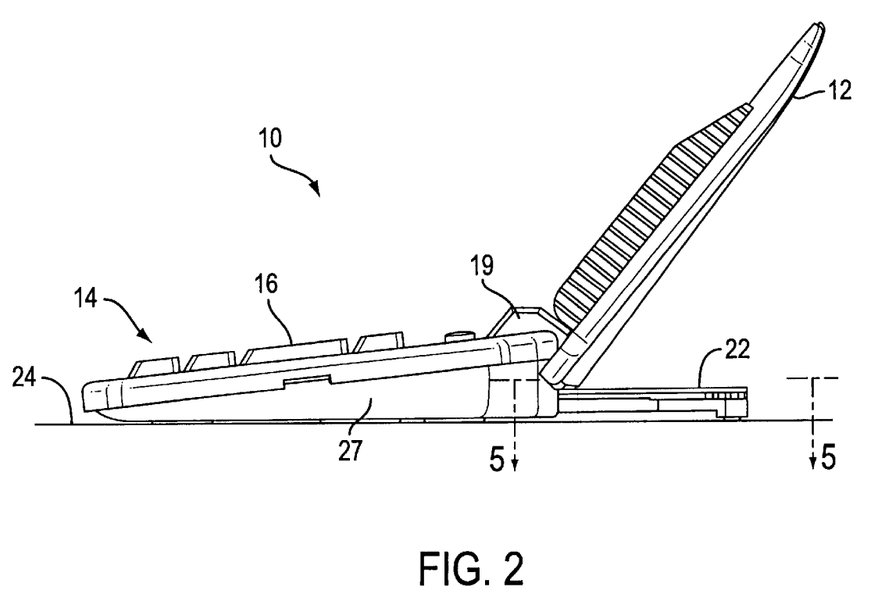
FIG. 2 is a side elevational view of the keyboard system of FIG. 1.

FIG. 2 shows a side elevational view of the keyboard system of FIG. 1. When the keyboard portion 14 is placed on a flat surface the points of contact between the base 27 and that surface define an imaginary plane hereinafter known as the support plane 24. The points of contact that define the support plane 24 may be specially designed dimples on the exterior of the base 27, or they may be small resilient pads attached thereto. Alternately, the entire exterior of the base 27 may be planar, in which case the base 27 and the support plane 24 would be coplanar. In such an embodiment the exterior surface of the base 27 may be textured to provide increased resistance to slipping and shifting.

In addition to the cover portion 12, the keyboard portion 14, and the interface assembly 19, FIG. 2 also shows a stabilizing feature in the form of a stabilizing leg 22 intended to prevent the keyboard system from tipping over backward. In the preferred embodiment the stabilizing leg 22 retracts into a recess within the keyboard portion 14 when the keyboard system 10 is not in use. When the keyboard system 10 is in use the stabilizing leg 22 is fully extended, such that the bottom surface of the stabilizing leg 22 is coplanar with the support plane 24.

The value of the stabilizing leg 22 design is several-fold. First, normal use of the keyboard system 10 is not likely to accidentally cause the stabilizing leg 22 to retract into the retracted position. Secondly, the preferred design for the stabilizing leg 22 allows for a large percentage of the bottom surface of the stabilizing leg 22, which is coplanar with the support plane 24, to be in physical contact with the surface on which the keyboard system 10 is resting, providing greater stability to the keyboard system 10. Such stability is provided both in terms of resistance to tipping and well as resistance to sliding and shifting. Additionally, a stabilizing leg 22 designed to extend from the keyboard portion provides good stability regardless of the position of the cover portion 12. Another embodiment of a stabilizing feature is an easel leg 26 as will be described with reference to FIGS. 11A and 11B.

Figure 3A:
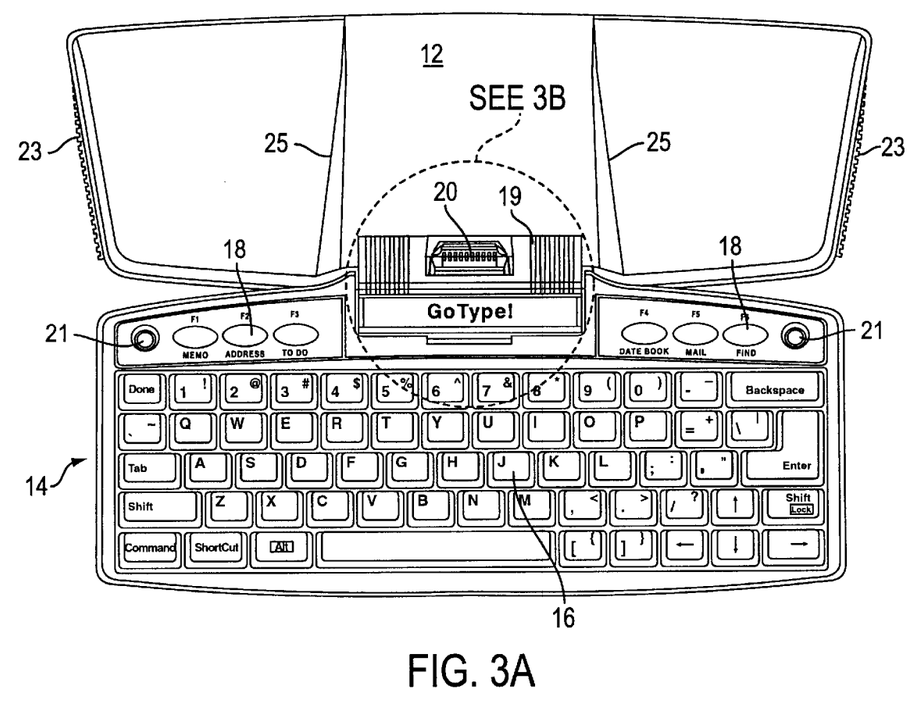
FIG. 3A is a top plan view of the keyboard system of FIG. 1.

FIG. 3A is a top plan view of the keyboard system of FIG. 1. Line 3B encircles the interface assembly 19, which is shown in an enlarged fashion in FIG. 3B. The interface assembly 19 is preferably fixed to the cover portion 12 and has a hinge connection on either side to allow the keyboard portion 14 to be pivotally connected to the cover portion 12 as will be described in more detail in reference to FIG. 4A.

Figure 3B:
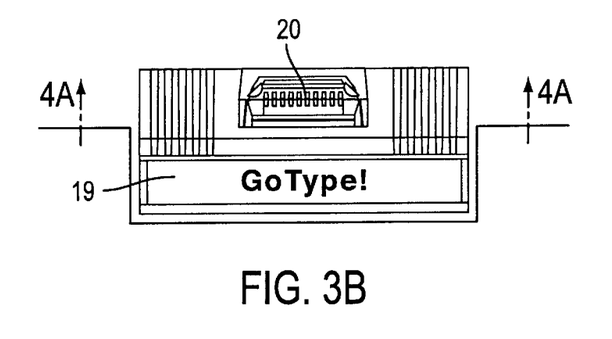
FIG. 3B is an enlarged view of the interface assembly, encircled by line 3B of FIG. 3A.

An I/O connector 20 is mounted to the top of the interface assembly 19 as best seen in FIG. 3B. The I/O connector 20 in the preferred embodiment is designed to mate to the I/O port of a 3COM Palm III PDA. In other embodiments the I/O connector 20 would be specifically configured to other PDAs and other specific pen-based computers. Another embodiment would have an I/O connector 20 that was adaptable to more than one pen-based computer design. The specifications for the Palm III PDA is available from 3COM Corporation.

Figure 4A:
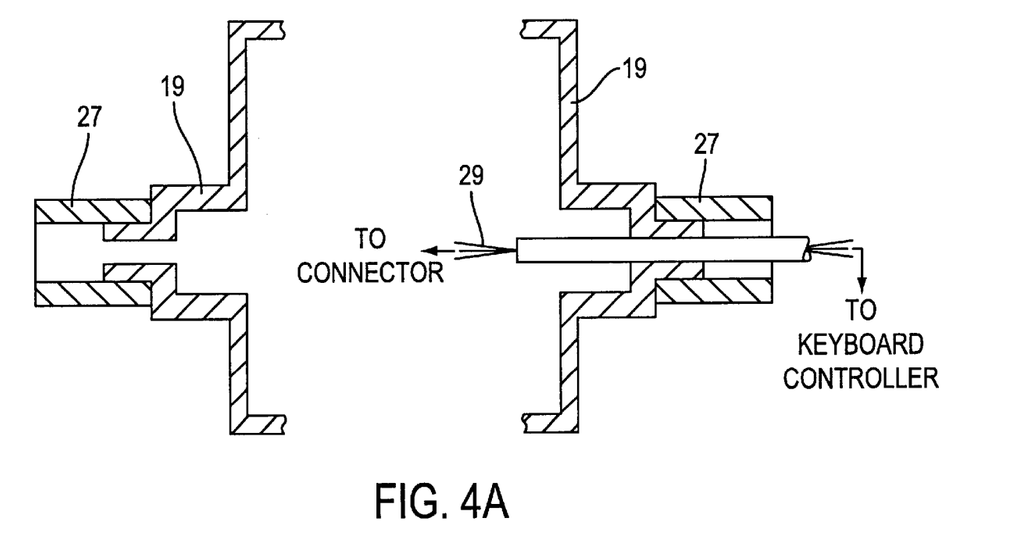
FIG. 4A is a partial cross-sectional view of the connector taken along line 4A 4A of FIG. 3B.

FIG. 4A is a partial cross-sectional view of the connector taken along line 4A—4A of FIG. 3B illustrating the hinge mechanism connecting the cover portion 12 to the keyboard portion 14, and more particularly to the base 27 of the keyboard portion 14. In the preferred embodiment the interface assembly 19 is fixed to the cover portion 12, thus the pivotal connection between the interface assembly 19 and the base 27 allows the cover portion 12 and interface assembly 19 to move together as the cover portion 12 is opened and closed. In order that the user may communicate to the computer apparatus by way of the keypad 16 and the buttons with programmable functionality 18, a cable comprising multiple wires 29 connects the I/O connector 20 to the control circuitry ("keyboard controller") of the keyboard portion 14. The cable also carries power from the I/O connector 20 to the keyboard controller (not shown). These wires 29 are routed from the I/O connector 20 through the interior of the interface assembly 19, through the hinge on the side of interface assembly 19 and into the matching hinge connector on the keyboard portion 14. These wires 29 arc shown in FIG. 4A passing through a sheath located along the axis of the hinge on the right side of the interface assembly 19. Other embodiments pass wires 29 through the left hinge or through both hinges. The sheath for the wires 29 shown in FIG. 4A helps prevent the wires 29 from interfering with the motion of the hinge and also prevents the wires 29 from rubbing and fraying.

Figure 4B:
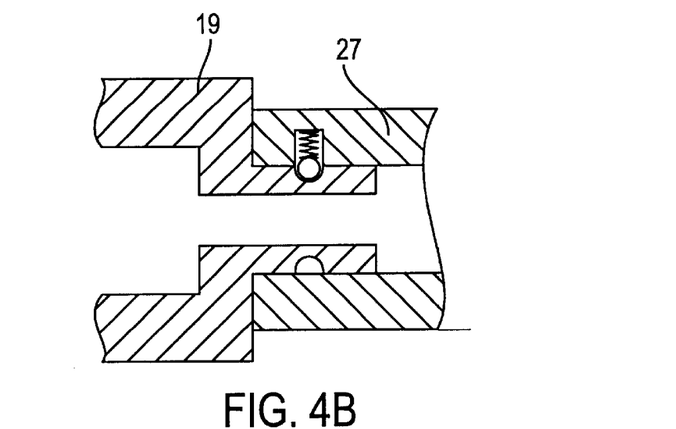
FIG. 4B is a partial cross-sectional view similar to that of FIG. 4A where the hinge mechanism is provided with a detent assembly.

FIG. 4B shows an enlarged view of one of the hinge connectors in FIG. 4A. In this view one possible design for a detent feature is illustrated. In this design the exterior surface of the hinge connector on the interface assembly 19 has one or more hemispherical depressions or "dimples." A cylindrical well on the corresponding hinge connector contains a spring and a spherical ball. When the interface assembly 19 is pivoted relative to the keyboard portion 14 the rotation around the axis will come to a stop when the spring-loaded ball meets a hemispherical depression. Application of sufficient rotational force to the hinge will push the ball back up into the cylindrical well against the pressure of the spring and allow the interface assembly 19 to freely rotate again.

By using such detents in the hinge connector the interface assembly 19 may be made to lock at one or more positions relative to the keyboard portion 14. In the preferred embodiment the interface assembly is fixed to the cover portion 12, thus the use of detents in the hinge connector effectively allows the cover portion 12 to be locked at one or more predetermined angles relative to the keyboard portion 14. It should be noted that many different methods for creating detents are known in the art and other embodiments of this invention may take advantage of these alternative designs.

Figure 5:
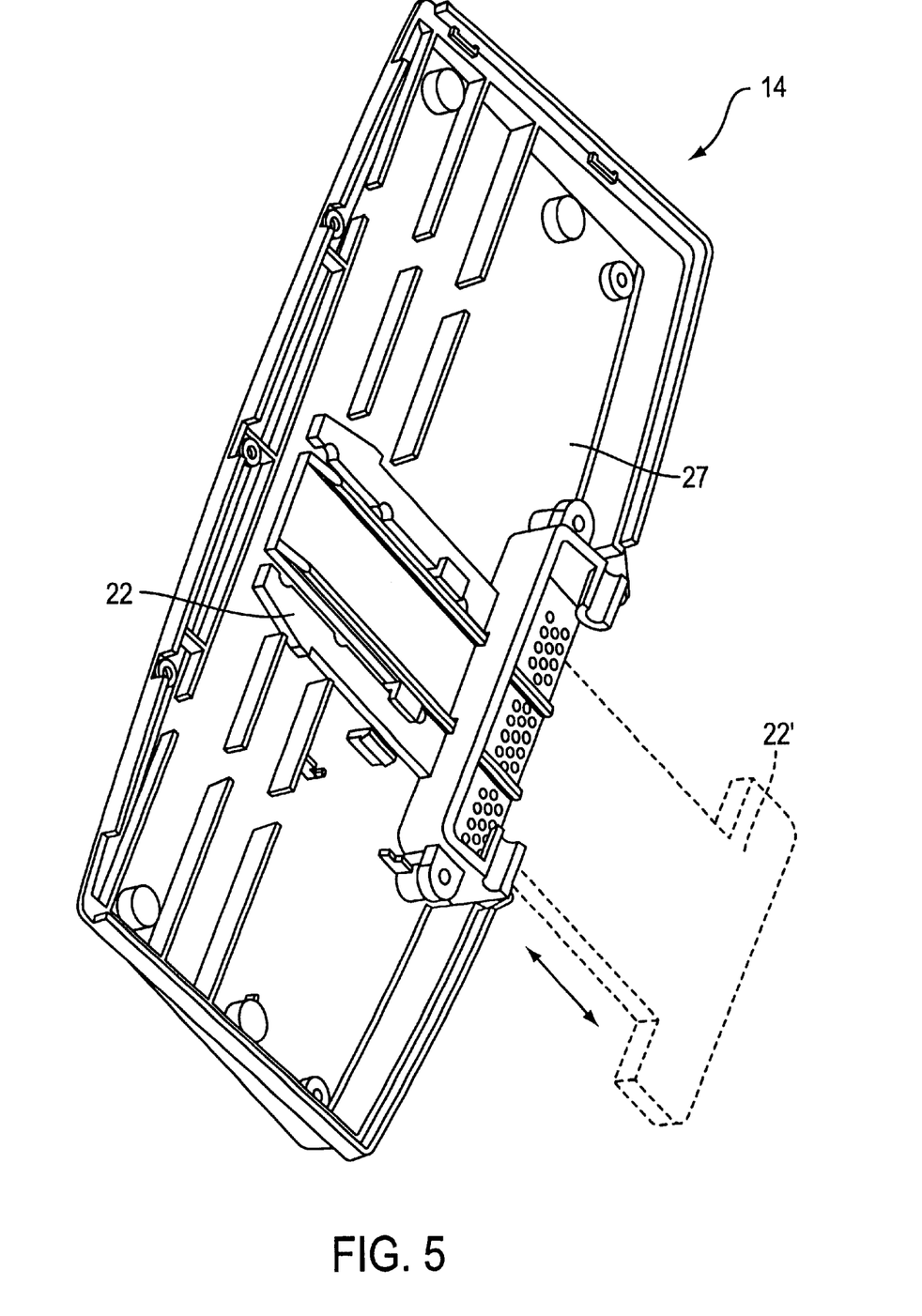
FIG. 5 is a perspective view of the base of the keyboard portion showing the stabilizing leg in the fully retracted position.

FIG. 5 shows the base 27 of the keyboard portion 14 beneath the keypad 16. Attention is directed to the stabilizing leg 22 shown fully retracted into the interior of the keyboard portion 14. The stabilizing leg 22 may be withdrawn through an opening in the back of the base 27 of the keyboard portion 14, shown as 22'. The stabilizing leg 22, as shown in FIG. 5, is T-shaped with a cross-member, a central leg, and two prongs on either side of the central leg. The central leg features two guide rails that are engaged by two corresponding notches in a support member on the interior of the keyboard portion 14. Each of the two prongs has a barb-shaped end so that when the stabilizing leg 22 is extended for use it can not be pulled completely out of the keyboard portion 14. Each prong additionally has a series of notches as part of a detent system. A corresponding component on the interior of the keyboard system 14 engages the notches on the stabilizing leg prongs causing the stabilizing leg 22 to have one or more locked positions. The advantage of such a locked position is that it helps prevent the stabilizing leg 22 from unintentionally being pushed back into the keyboard section 14.

Figure 6:
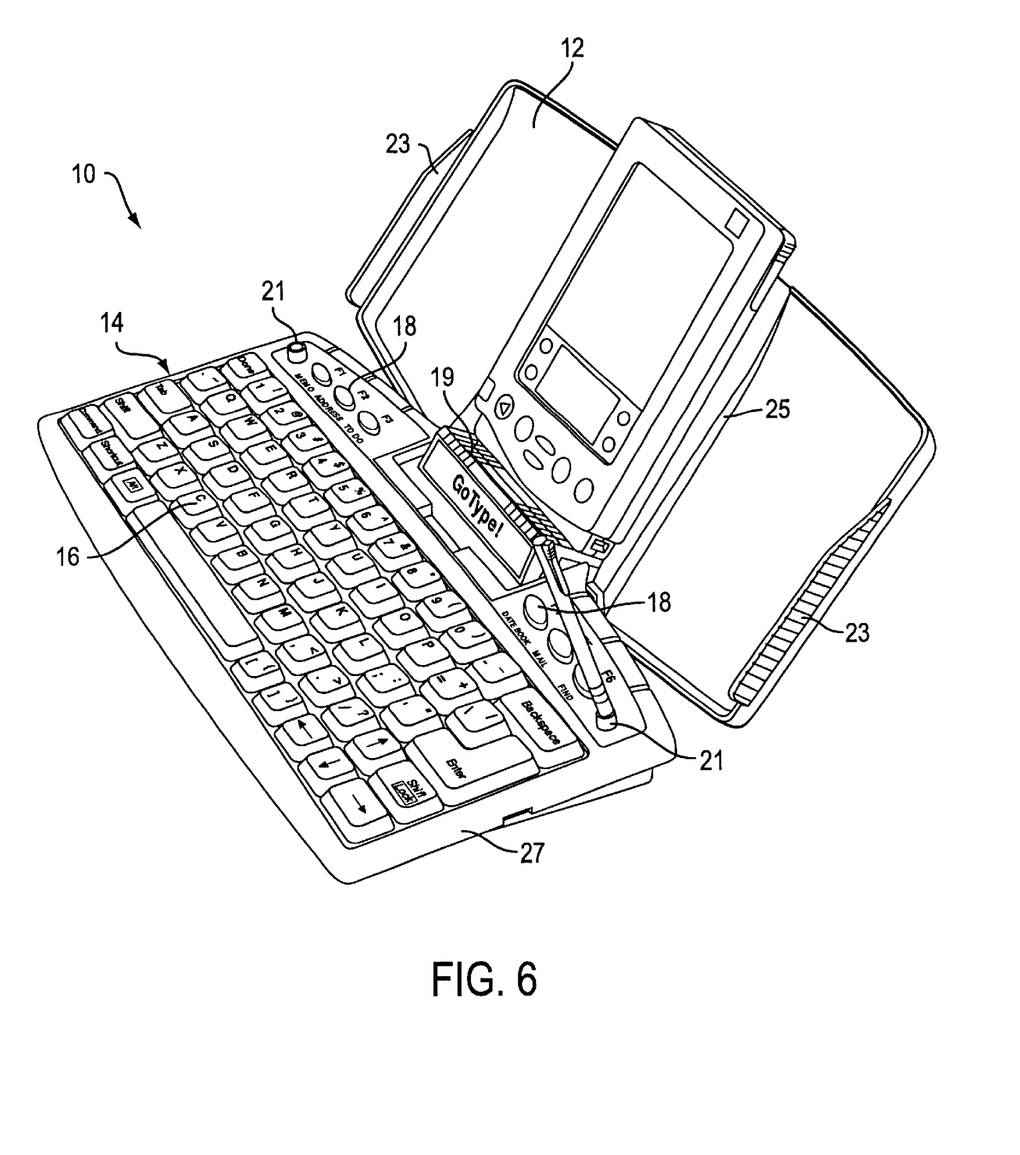
FIG. 6 is a perspective view, similar to FIG. 1, of a keyboard system of the present invention with a PDA engaged with the interface assembly.

FIG. 6 is a perspective view of the keyboard system of FIG. 1 showing a Personal Digital Assistant (PDA) attached to the I/O connector. In the preferred embodiment the inner surface of the cover portion 12 has vertical ribs 25 with a spacing between them just wide enough to accommodate and stabilize a PDA attached to the I/O connector 20. These vertical ribs 25 also add rigidity to the cover portion 12.

FIG. 6 additionally shows on the top left and top right corners of the keyboard portion 14 stylus receptacles 21 intended to hold a PDA stylus. In the illustration the stylus receptacle 21 on the right side of the keyboard portion 14 holds a stylus. While the preferred embodiment contains a stylus receptacle 21 on either side of the keyboard portion 14 for the convenience of both right and left-handed users, other embodiments of the keyboard system 10 would not contain such receptacles where the keyboard system 10 was for use with a computer apparatus that did not ordinarily need a stylus. Other embodiments contain only one receptacle 21 due to design constraints imposed by the style and placement of the keypad 16 on the keyboard portion 14. Additional embodiments place the stylus receptacle 21 on the inside of the cover portion 12 on either or both sides of the intended location for the computer apparatus.

Figure 7:
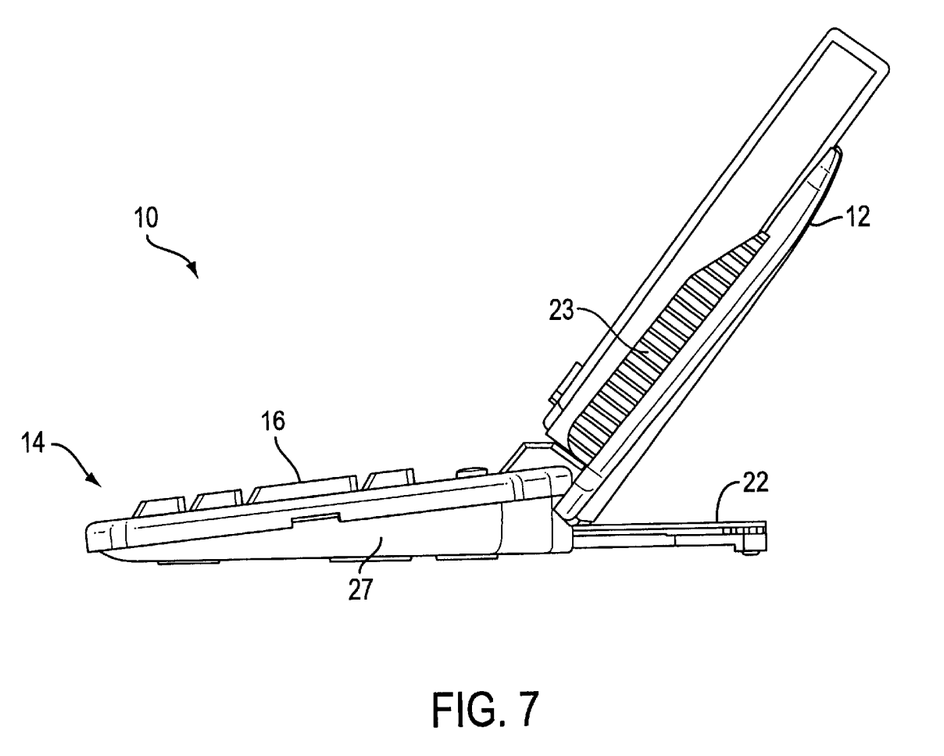
FIG. 7 is a side elevational view, similar to FIG. 2, of a keyboard system of the present invention with a PDA engaged with the interface assembly.

FIG. 7 is a side elevational view of the keyboard system of FIG. 1 supporting a PDA. The illustration shows one of two side flaps 23 on either side of the cover portion 12 that provide rigidity to cover portion 12 and further serve to protect the keyboard portion 14 from side entry of dirt, dust, and fluids when the cover portion 12 is closed. Additionally, the side flaps contain a latch mechanism 32 which will be discussed in detail with reference to FIG. 10A.

Figure 8A:
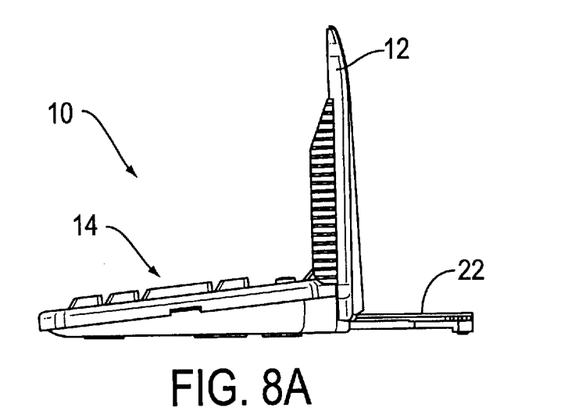
FIG. 8A is a side elevational view of the keyboard system of FIG. 1 with the cover portion opened to 90°.
Figure 8B:
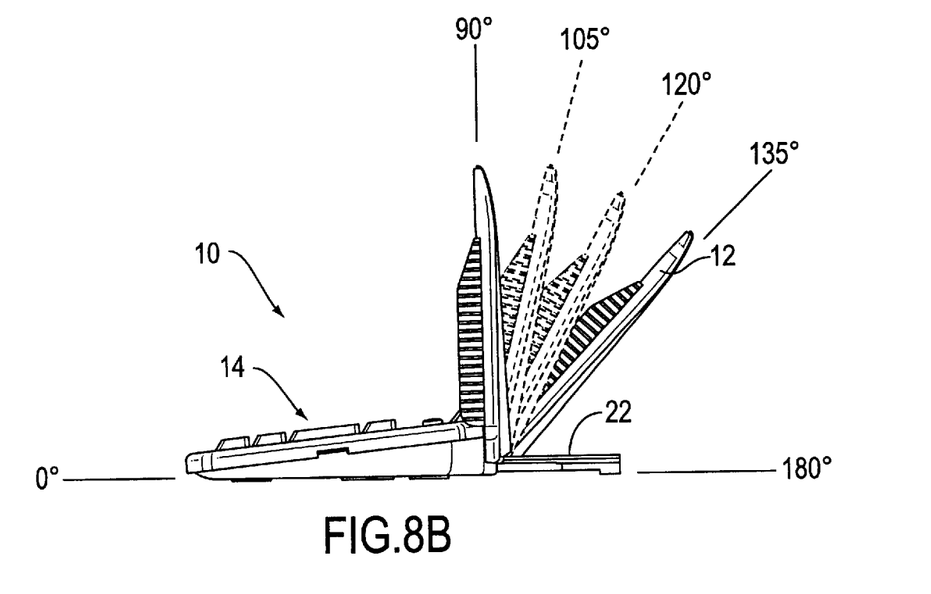
FIG. 8B is a side elevational view of the keyboard system of FIG. 1 showing the cover portion opened to several viewing positions.
Figure 8C:
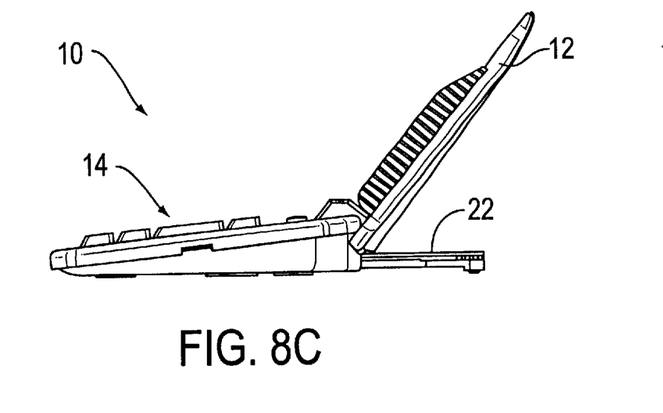
FIG. 8C is a side elevational view of the keyboard system of FIG. 1 showing the cover portion opened to 135°.

FIGS. 8A–8C are side elevational views of the keyboard system of FIG. 1 with the cover portion 12 opened to different positions. As shown, rotation around the axis of a hinge allows the cover portion 12 to move from a closed position wherein the angle between the plane of the cover and the support plane 24 is 0°, and any number of open positions wherein the angle between the plane of the cover and the support plane 24 is at least 90° and preferably 135°, which would place the cover such that it would support a 3COM Palm PDA at the recommended viewing angle. The cover, which serves as a support easel for the PDA, is supported in these multiple positions by the aforementioned detent mechanism. Preferably, the hinge is part of the interface assembly 19 as described above with reference to FIG. 4A, however in other embodiments this is not necessarily so. In other embodiments the hinge may be designed as a separate component from the interface assembly 19, or alternately, the cover portion 12 may attach to the keyboard portion 14 by hinges directly attached to both pieces.

Figure 9:
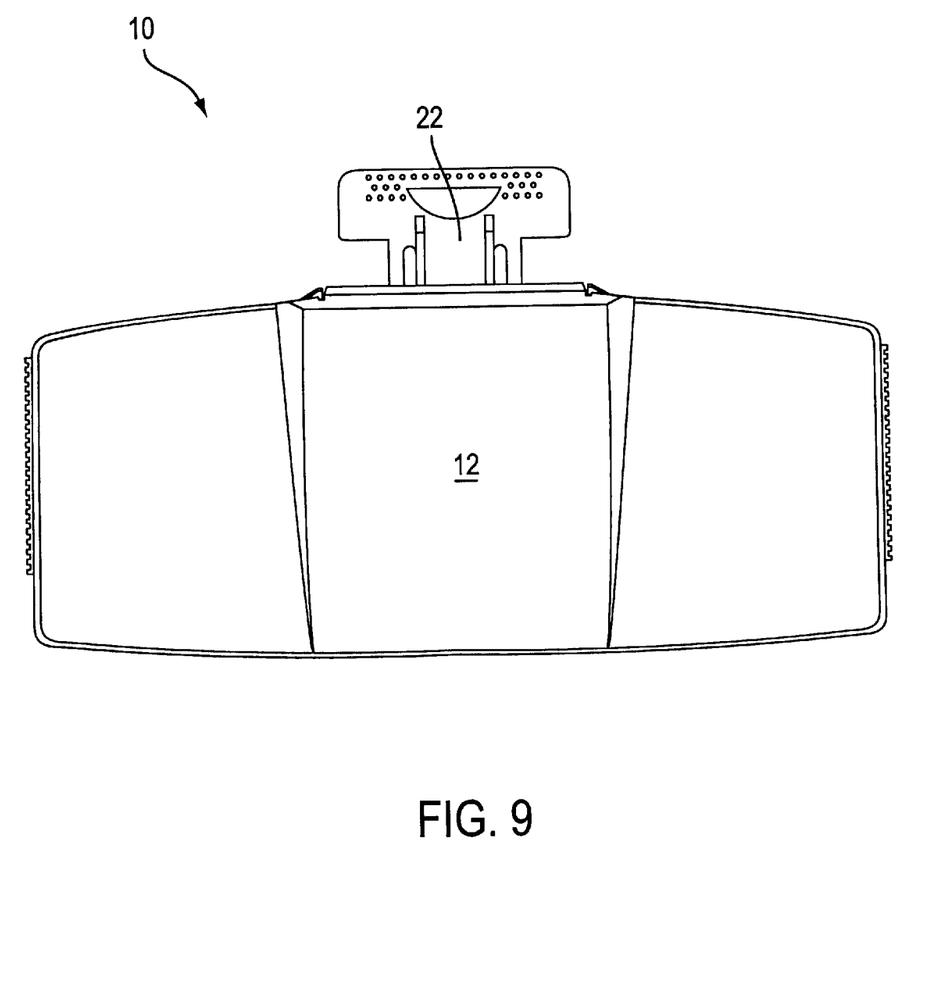
FIG. 9 is a top plan view of the keyboard system of FIG. 1 with the cover portion closed and the stabilizing leg fully extended.

FIG. 9 is a top plan view of the keyboard system of FIG. 1 with the cover portion closed and the stabilizing leg 22 fully extended. In this perspective the stabilizing leg 22 can be seen to have a semicircular cut-out in the middle of its cross-member. This feature is designed to allow the stabilizing leg 22 to be grasped firmly by the customer s and also reduces the overall weight of the keyboard system 10.

Figure 10:
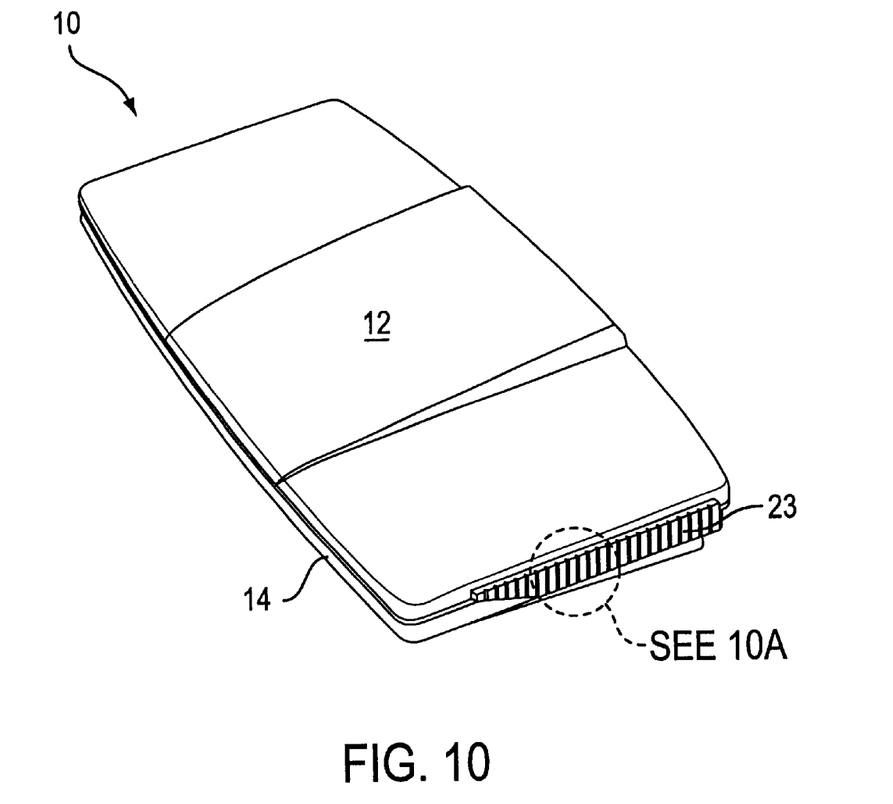
FIG. 10 is a perspective view of the keyboard system of FIG. 1 in its closed orientation.
Figure 10A:
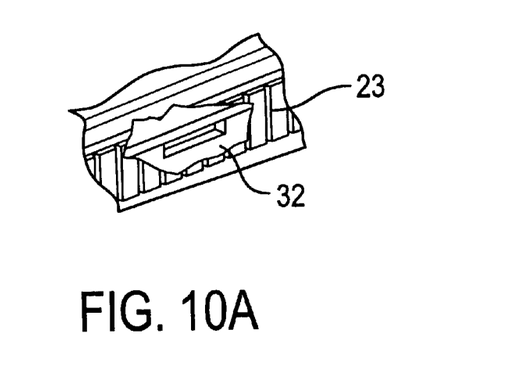
FIG. 10A is a detailed partially broken view taken along line 10A of FIG. 10.

FIG. 10 is a perspective view of the keyboard system of FIG. 1 in its closed orientation. The side flaps 23, discussed above in reference to FIG. 7, in the preferred embodiment contains a latch mechanism 32. The latch mechanism is shown in greater detail in FIG. 10A and consists of a small tab 31 on the inside of the side flap 23 and a corresponding indentation on the exterior of the base 27. When the tab 31 is engaged in the corresponding indentation the cover closes securely such that it is not easily opened accidentally. Tab 31 is shown in FIG. 1. In other embodiments of the present invention the latch mechanism 32 is placed on the front edge of the cover portion 12, and still other embodiments do not contain a latch at all. Further, some embodiments also do not contain side flaps 23.

Figure 11A:
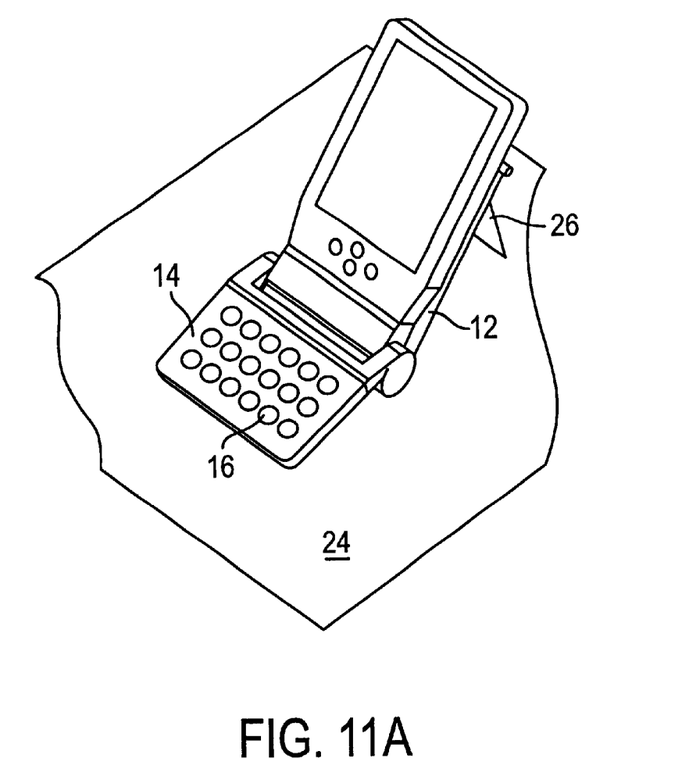
FIG. 11A is a perspective view of the keyboard system with a non-standard keypad and an easel stabilizing leg.
Figure 11B:
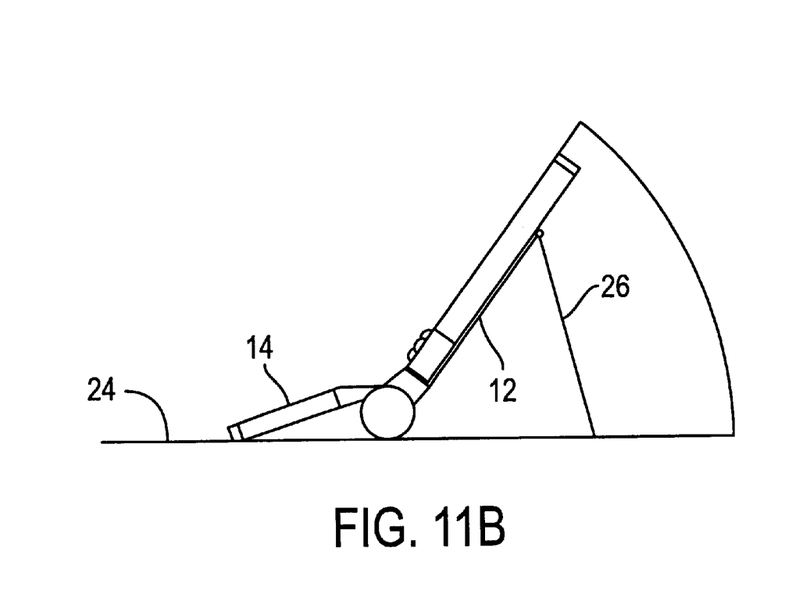
FIG. 11B is a side elevational view of the keyboard system in FIG. 11A.

FIGS. 11A and 11B are perspective and side elevational views, respectively, of the keyboard system 10 with a non-standard keypad and an easel leg 26 rather than a stabilizing leg 22. As noted previously, the preferred embodiment of the present invention incorporates a standard QWERTY keypad 16, however other embodiments of the invention utilize other keypad options. As shown in FIG. 11A, alternative keypad 16 designs, for example the 10-key layout frequently used in inventory control, would not require as wide of a keyboard portion 14 as the preferred embodiment.

The stabilizing feature shown in FIGS. 11A and 11B is in the form of an easel leg 26 that folds flush against the exterior surface of the cover portion 12. When the keyboard system 10 is in use, the easel leg 26 folds out to an open position as shown in FIGS. 11A and 11B. In another embodiment of the invention, the easel leg 26 folds into a recessed portion on the exterior surface of the cover portion 12. Like the stabilizing leg 22, the easel leg 26 provides support to prevent the keyboard system from tipping over backwards.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A handheld computer keyboard system comprising:
   a keyboard portion including a keypad;
   an interface assembly installed between said keyboard portion and a computerized apparatus such that said interface assembly serves as a hinge between said keyboard portion and said computerized apparatus, said interface assembly comprising an electrical connection between said keyboard portion and said computerized apparatus, said interface assembly further comprising an I/O connector configured to engage an I/O port of said computerized apparatus; and
   a plurality of wires connecting said I/O connector to said keyboard portion through said interface assembly.

2. A hand held computer keyboard system as recited in claim 1, further comprising an easel leg coupled to said keyboard portion.

3. A hand held computer keyboard system as recited in claim 2, wherein said easel leg is coupled to the back of said keyboard portion.

4. A hand held computer keyboard system as recited in claim 2, wherein said easel leg can retract into said keyboard portion.

5. A hand held computer keyboard system as recited in claim 1, wherein said keypad is arranged in a standard QWERTY format.

6. A hand held computer keyboard system as recited in claim 5, wherein said keyboard portion includes a plurality of buttons in addition to those required by said QWERTY format.

7. A hand held computer keyboard system as recited in claim 6, wherein said additional plurality of buttons have programmable functionality.

8. A hand held computer keyboard system as recited in claim 1, wherein said keypad is arranged in a standard 10-key data-entry format.

9. A hand held computer keyboard system as recited in claim 8, wherein said keyboard portion includes a plurality of buttons in addition to those required by said 10-key format.

10. A hand held computer keyboard system as recited in claim 9, wherein said additional plurality of buttons have programmable functionality.

11. A hand held computer keyboard system as recited in claim 1, wherein the computerized apparatus is a PDA.

12. A hand held computer keyboard system as recited in claim 11, wherein the hand held computer keyboard system draws power from the PDA.

13. A hand held computer keyboard system as recited in claim 1, further comprising a cover portion coupled proximate to the back of said keyboard portion.

14. A hand held computer keyboard system as recited in claim 13, wherein said cover portion is capable of enclosing said keyboard portion when said keyboard system is not in use.

15. A hand held computer keyboard system as recited in claim 13, wherein said cover portion exposes said keyboard portion when said keyboard system is in use.

16. A hand held computer keyboard system as recited in claim 1, further comprising an easel leg coupled to said computerized apparatus.

17. A hand held computer keyboard system as recited in claim 16, wherein said easel leg is coupled to a back of said computerized apparatus.

18. A hand held computer keyboard system as recited in claim 16, wherein said easel leg can retract into said keyboard portion.

* * * * *